April 30, 1935.   C. G. SEYFERTH ET AL   1,999,375
FIFTH WHEEL CONSTRUCTION
Filed May 21, 1934   2 Sheets-Sheet 1
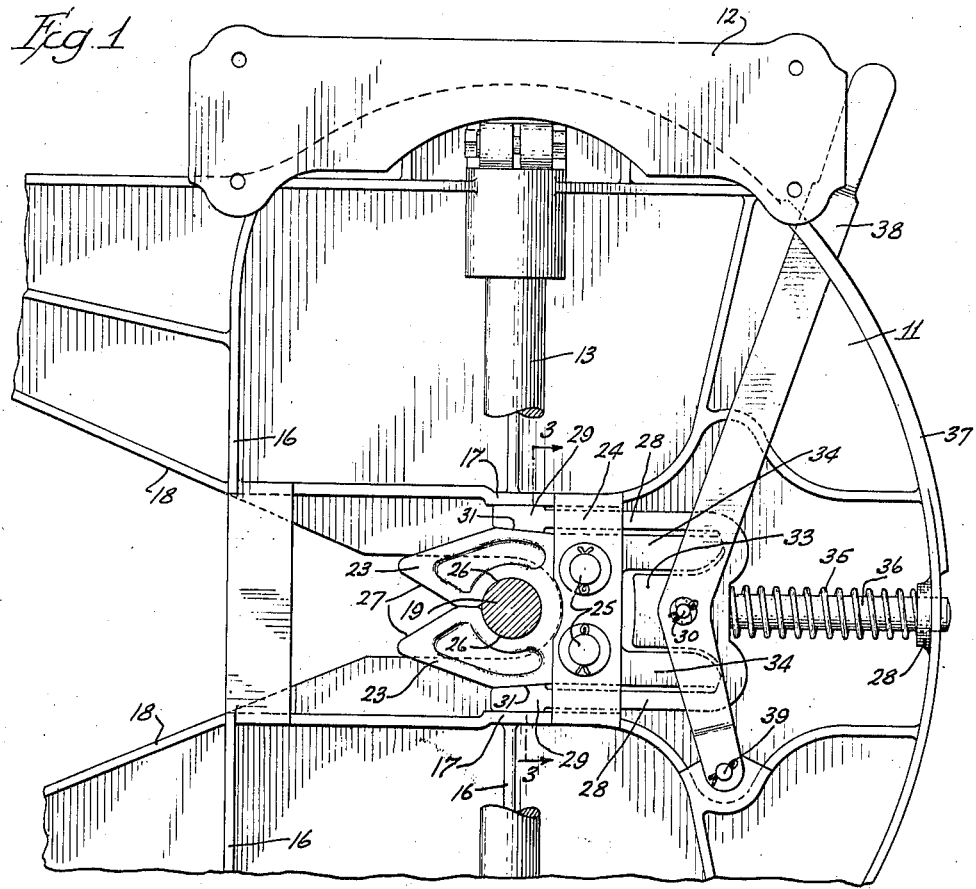
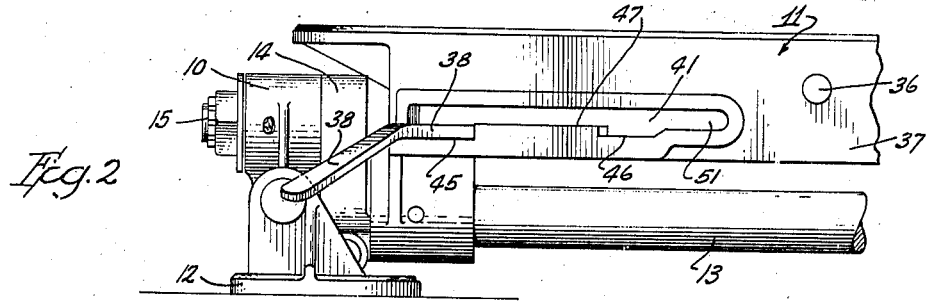
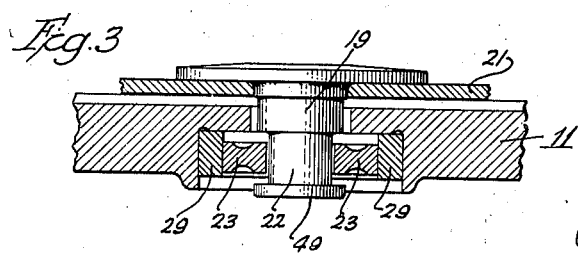
Inventors:
Carl G. Seyferth
Hilbert E. Swanson and
Charles B. Rasmussen
Atty.

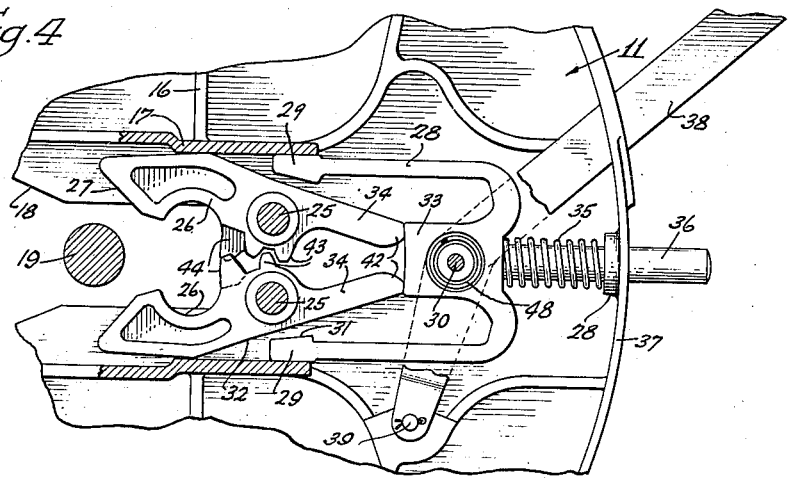
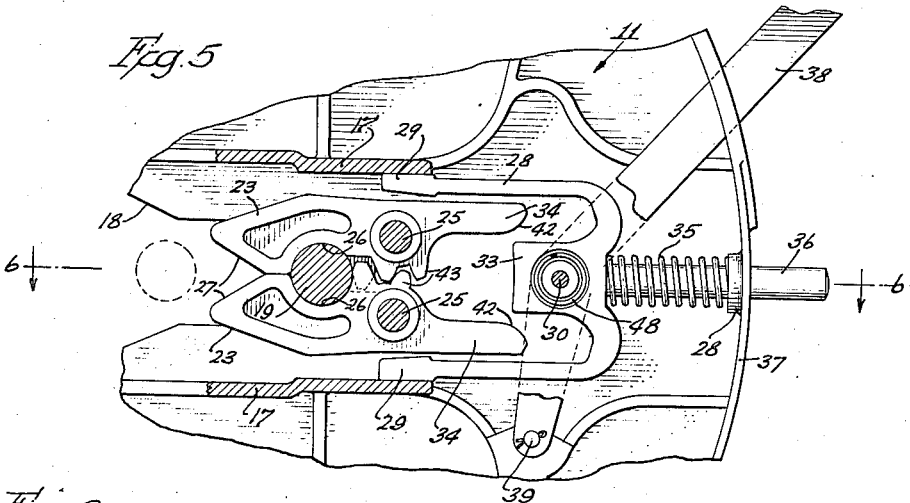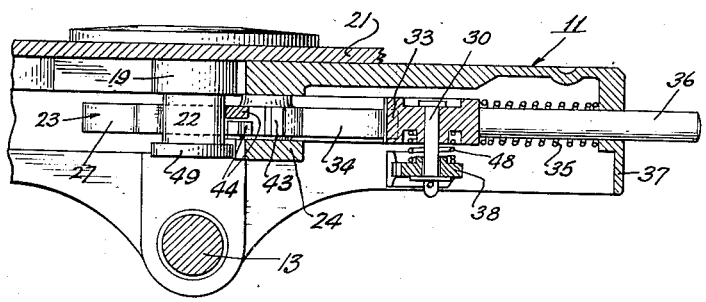

Patented Apr. 30, 1935

1,999,375

UNITED STATES PATENT OFFICE 1,999,375

FIFTH WHEEL CONSTRUCTION

Carl G. Seyferth and Hilbert E. Swanson, Muskegon, Mich., assignors to West Michigan Steel Foundry Co., Muskegon, Mich., a corporation of Michigan Application May 21, 1934, Serial No. 726,726

9 Claims. (Cl. 280—33.1)

This invention relates to fifth wheel constructions and has more particular reference to coupling means for connecting a trailer and a tractor vehicle with each other.

A principal object of the invention is the provision of coupling means for a king pin of a trailer vehicle, which coupling means becomes operative automatically upon the king pin and tractor plate assuming the proper position for establishing operative relation between the two vehicles.

Another important object of the invention is the provision of coupling means in which a clamping effect is produced upon the king pin by means movably mounted on the tractor plate and the provision for manual and automatic control of the clamping elements on the tractor plate.

Another important object of the invention is the provision of coupling means and means for maintaining the clamping elements normally in release position ready for the introduction of the pin as long as the tractor vehicle is separated from the trailer vehicle.

A further important object of the invention is the provision of a coupling between a tractor and a trailer wherein a manual controlling element is adapted to be locked in release position or locking position.

Another important object of the invention is the provision of means for locking the king pin encircling jaws in closed position.

A further object of the invention is the provision of a coupling between a tractor and a trailer vehicle in which the axial movements of the coupling or king pin are prevented or at least limited to a predetermined extent, the clamping elements for holding the pin against withdrawal from operative position also preventing excessive relative movement of the locking pin in axial direction with respect to the tractor plate.

Numerous other objects and advantages of the invention will be apparent as it is better understood from the following description, which, when taken in connection with the accompanying drawings, illustrates a preferred embodiment thereof.

On the drawings,

Figure 1 is a fragmentary bottom plan view, partly in section, of the structure shown in coupled position;

Fig. 2 is a fragmentary end elevation of portions of the structure viewed from the right in Fig. 1;

Fig. 3 is a transverse fragmentary sectional view taken substantially on the line 3—3 of Fig. 1 and showing the king pin and locking jaws in locked position;

Fig. 4 is a fragmentary bottom plan view of the operative parts of the structure in complete released position;

Fig. 5 is a fragmentary bottom view of the same parts, prior to withdrawal of the king pin, with the sliding yoke locked in released position; and Fig. 6 is a fragmentary longitudinal section taken substantially on the line 6—6 of Fig. 5, partly in elevation.

Referring to the drawings, reference character 11 indicates the lower fifth wheel member or tractor plate supported on the body of a tractor vehicle (not shown) by means of brackets 12 which are bolted or otherwise secured to the top surface of the body or frame of the tractor vehicle, and which carry the supporting cross shaft 20 or axle 13 of the tractor plate through links 14, each connected at its upper end to a pivot pin 15 journalled in bearings 16 carried by the brackets 12, and connected at its lower end to the plate supporting cross shaft or axle 13.

The plate 11 is provided on its under face with a plurality of reinforcing ribs 16, some of which extend parallel to each other at 17 while others may extend in angular directions. The rear portion of the plate 11 is provided with a flaring opening 18 into which the king pin 19 of the upper fifth wheel member 21 carried by the trailer vehicle may be introduced for connection with the tractor plate 11 of the tractor vehicle.

This king pin 19 is carried by the upper fifth wheel of the trailer and is provided between its ends with a neck portion 22 in which the locking elements for maintaining the proper relation between the pulling vehicle and the trailer are adapted to engage. Viewing Fig. 3, it will be noted that the neck portion 22 of the pin 19 is reduced in diameter as compared with the parts of the pin above and below the neck.

For the purpose of maintaining this pin 19 locked in operative position with respect to the tractor plate 11, a pair of locking jaws 23 is mounted on the under face of the plate, the ribs or guide members 17 on the under face of the tractor plate being connected by an integral bridge 24 wherein the pivot pins 25 for the jaws are secured. The jaws 23 are provided with complementary arcuate clamping faces 26 adapted to embrace the neck portion 22 of the king pin 19, and with flaring cam edges 27 forward of the arcuate clamping surface portions.

In order to maintain the jaws in clamping position, jaw locking means are disposed on the lower face of the tractor plate 11, together with mechanism for withdrawing said locking means from locking position.

The locking mechanism comprises a yoke, generally indicated at 28, slidably mounted on the lower face of the tractor plate between said lower face and the bridge 24 which connects the ribs 17. The free ends of the legs of the yoke 28 are provided with wedge-shaped enlargements 29 adapted for insertion between the parallel ribs or guide members 17 which form guides therefor and with inclined surfaces or faces 31 for cooperation with the correspondingly inclined outer edges of the jaws 23. The transverse member of the bail-shaped yoke 28 has an enlargement 33 adapted to be inserted between the tail pieces 34 of the clamping jaws thereby holding said clamping jaws positively in locking position. When the parts are in released position the tail pieces 34 of the jaws 23 are in abutting engagement with the enlargement 33 of the transverse portion of the yoke (Fig. 4), whereby movement of the yoke to jaw locking position is prevented. The yoke is maintained yieldingly in this position by means of a spring 35 surrounding a guide stem 36 which extends slidably from the transverse portion of the yoke radially outwardly through an opening in a forwardly depending flange 37 of the tractor plate 11.

Displacement of the yoke 28 from this position may be accomplished by overcoming the action of the spring 35, and during this movement the yoke will withdraw the wedge-shaped enlargement 29 from the space between the parallel ribs or guide members 17 and the locking jaws 23. For the purpose of effecting this withdrawal, a lever 38 is pivotally secured at one end by means of a pin 39 to the tractor plate 11 at the lower face thereof and is pivotally connected intermediate its ends to the enlargement 33 of the yoke by a pin 30, there being sufficient clearance between the inner edges of the tails 34 of the locking jaws 23 and the enlargement 33 of the yoke to permit this movement (Fig. 6). The free or outer end of the lever 38 projects through an elongated slot 41 provided in the circumferential flange 37 of the tractor plate.

Upon withdrawal of the yoke from the locking position shown in Fig. 1 to the released position shown in Fig. 5, the locking jaws 23 are free to move outwardly and when longitudinal movement of the tractor vehicle relatively to the trailer takes place, the king pin 19 will exert a spreading action upon the locking jaws, rocking the same about the pivot pins 25 to the position shown in Fig. 4, whereby a passage is created between the inner faces of the locking jaws broad enough to permit the king pin 19 to movement between the same and release the trailer from the tractor vehicle.

During this rocking movement of the clamping jaws, the tails 34 of the jaws are rocked towards each other, and cam surfaces 42 of the tail pieces 34 are forced into frictional engagement with the enlargement 33 of the yoke, thus forcing this enlargement and the entire yoke back to cause it to assume the position of Fig. 4.

The tail pieces 34 are maintained in frictional engagement with enlargement 33 since the spring 35 continuously urges the yoke toward the ends of the tail pieces 34.

Owing to this frictional holding engagement produced by the yoke on the cam ends of the tail pieces of the locking jaws when the latter are in released position, the jaws remain in readiness to again receive the king pin 19 of the trailer when it is desired to re-establish connection between the trailer and the tractor.

In order to unify the rocking movement of the jaws 23 from the locking position shown in Fig. 1 to the complete release position shown in Fig. 4, the two locking jaws are operatively interconnected so that the movement of one of said jaws will induce a corresponding movement of the companion jaw. This interconnection in the present construction is effected by means of gear teeth 43 with which the opposite faces of the locking jaws are equipped.

Viewing Figs. 4 and 6, it will be noted that the faces of the clamping jaws adjacent the arcuate edges of the same are provided with abutments 44, the abutment on one jaw overlying the abutment of the other jaw so that these two abutments lie in different planes and do not act upon each other in the manner of gear teeth.

It will be apparent that upon the introduction of the pin 19 into the opening provided between the operative arcuate clamping faces of the jaws 23 when the latter have been moved to release position, the king pin 19 will encounter one or both abutments of either or both of said jaws 23 and will set up a rocking movement of said jaws about their pivot pins 25 by means of which they swing to operative engagement with the king pin 19. Regardless of the engagement with either one of said abutments 44 the rocking movement imparted thereby to the respective jaw will be communicated by means of the gear teeth 43 to the other jaw so that the two jaws are simultaneously moved into king pin locking position.

The slot 41 through which the free end of the lever 38 projects from the tractor plate is formed with spaced recesses whereby said lever is locked against accidental displacement from either locking or release positions. These recesses are indicated at 45 and 46 respectively, Fig. 2. The recess 45 is provided to lock the lever in jaw closing position. When it is desired to uncouple the vehicles, the lever 38 is manually moved from the recess 45 into recess 46 which maintains the yoke in the releasing position shown in Fig. 5. Upon separation of the vehicles, the jaws open and their tail pieces 34 ride upon the enlargement 33 of the yoke 28 further tensioning the spring 35 and moving locking lever 38 out of recess 46 and into the extreme right hand end 51 of slot 41, as viewed in Fig. 2. The lever 38 is locked against accidental displacement from either position and is maintained in either of these recesses by a compression spring 48 surrounding the connector pin 30 of the lever, by which it is attached to the enlargement 33 of the yoke 28. Owing to this spring 48 being interposed between the yoke and the lever, the latter is urged downward on the pin 30 and is also urged to enter the locking recesses 45, 46 of the slot 41 in which said lever is movable.

It is believed that the operation of the device will be fully understood from the foregoing description. When the trailer is disconnected from the tractor vehicle, the locking jaws 23 are maintained in the position shown in Fig. 4 because of the yielding frictional engagement between the tail pieces 34 of the jaws 23 and the enlargement 33 on the sliding yoke 28. The lever 38 is maintained in the extreme right hand end 51 of the slot 41 as will be seen by viewing Fig. 2.

When it is desired to establish connection between the vehicles, the tractor is moved towards the trailer, so that the king pin 19 enters between the jaws 23. The king pin strikes the abutments 44 and forces the jaws 23 together and swings the cam edges of the tail pieces 34 out of engagement with the enlargement 33. The spring immediately advances the yoke 28 from the position shown in Fig. 4 to the jaw locking position shown in Fig. 1. At the same time, the movement of the sliding yoke 28 to jaw locking position under the action of spring 35 moves the locking lever 38 from the position shown in Fig. 4 to the position shown in Fig. 1. The movement being sudden, the lever passes locking recess 46 to the extreme opposite end of slot 41 where it is urged into locking recess 45 under action of spring 48.

In this manner the locking engagement for the jaws is completed. The wedge-shaped enlargements 29 of the sliding yoke prevent the outward spreading of the jaws and insertion of the enlargement 33 between the tail pieces 34 of the jaws prevents swinging movement of the jaws towards release position. The lever 38 is seated in the locking recess 45 to prevent its accidental movement in the slot 41.

Viewing Fig. 6, it will be noted that the locking jaws 23 engaging the reduced neck portion of the king pin serve to prevent vertical displacement of the king pin, since the latter is provided with an enlarged flange 49 beneath said reduced neck portion and with an enlargement above the same. While there is some play for vertical movement of the pin, as required during the use of the coupled vehicles, disengagement of the pin by vertical movement from the space between the locking jaws is prevented.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a coupling device for trailer and tractor vehicle having a plate on one vehicle and a king pin on the other vehicle, and a pair of king pin receiving jaws mounted on said plate, ribs on said plate, and a yoke member slidable to one position between said jaws and said ribs to lock said jaws in king pin engaging position and slidable to another position to be engaged by said jaws and to maintain the same in king pin receiving position.

2. In a coupling device for a trailer and tractor vehicle having a plate on one vehicle and a king pin on the other vehicle, and a pair of king pin receiving jaws mounted on said plate, ribs on said plate, a yoke member slidable to one position between said jaws and said ribs to lock said jaws in king pin engaging position and slidable to a second position out of engagement with said jaws, and means on said jaws and said yoke for moving said yoke from said second position to a third position whereby said yoke is maintained out of jaw locking position.

3. In a coupling device for a trailer and tractor vehicle having a plate on one vehicle and a king pin on the other vehicle, and a pair of king pin receiving jaws mounted on said plate, means for locking said jaws in king pin engaging position in one position, means for moving said jaw locking means into inoperative position, and means on said jaws and said yoke for moving said jaw locking means from inoperative position when said jaws are moved to king pin receiving position to a position wherein said jaw locking means maintains said jaws in king pin receiving position.

4. In a coupling means for a trailer and tractor vehicle having a tractor plate on one of the vehicles and a king pin on the other vehicle, a pair of clamping jaw members pivotally mounted on the tractor plate, a yoke comprising a transverse portion and a pair of parallel leg portions, said transverse portion being adapted to be engaged by a portion of said jaw members, means on the tractor plate for guiding said yoke, and means for imparting movement to said yoke along said guiding means for forcing the leg portions of said yoke into engagement with the jaw members.

5. In a coupling means for a trailer and tractor vehicle having a tractor plate on one vehicle and a king pin on the other vehicle, a pair of clamping jaws pivotally secured to the tractor plate, said jaws being each provided with an arcuate pin engaging face at one end portion and having a tail end at the opposite end portion, and means slidably secured on the tractor plate for locking said jaws in pin engaging position, said locking means being operative upon the portions of the jaws provided with the pin engaging surfaces and also being operated upon by the opposite ends of said jaws when the same are in non-clamping position to force said locking means to a position to maintain said jaws in non-clamping position.

6. A coupling for a trailer and tractor vehicle having a tractor plate on one vehicle and a pin on the other vehicle, a pair of clamping jaws pivoted intermediate their ends on the tractor plate, said jaws being provided with pin clamping portions adapted to embrace the pin when the latter has been moved to a predetermined position relatively to the tractor plate, a yoke slidably guided on the tractor plate to lock the clamping jaws in clamping position relatively to the pin, automatically operative means constraining said yoke to move to said clamping position, manually operative means secured to said tractor plate and to said yoke for releasing the yoke from said clamping position, and means on the tractor plate for holding said manually operative means fixedly in yoke locking position and against accidental displacement in yoke release position, respectively, said manually operative means being adapted to be automatically released from the latter position.

7. In a fifth wheel device for a trailer and tractor vehicle having a plate element on one vehicle, a pair of king pin engaging jaw members mounted on said plate, a yoke member slidably mounted on said plate to assume one position for locking said jaws in king pin engaging position, a second position in inoperative relation with said jaws, and a third position for maintaining said jaws in king pin receiving position, manually operable means for moving said yoke from jaw locking position to inoperative position, latching means for normally maintaining said manually operable means and said jaws in locking position and inoperative position, respectively, said jaws being adapted to move said yoke from inoperative position to said third position upon disengagement, of said king pin therefrom, and means automatically operable upon engagement of said king pin with said jaws to force said yoke into jaw locking position and return said manually operable means to latched position for maintaining said yoke in jaw locking position.

8. In a coupling means for a trailer and tractor vehicle having a tractor plate on one vehicle and a king pin on the other vehicle, a pair of clamping jaws pivotally secured intermediate their ends to the tractor plate, said clamping jaws being provided with pin clamping portions at their front ends, a yoke slidably mounted on the tractor plate, means for normally constraining said yoke into engagement with those portions of the clamping jaws on which the pin engaging surfaces are provided, manually operative means for effecting the release of said yoke from operative position relatively to the clamping jaws, and means at the opposite ends of the clamping jaws for effecting additional movement of said yoke to release position when the clamping jaws have been released from said yoke.

9. In a coupling means for a trailer and tractor vehicle having a tractor plate on one vehicle and a king pin on the other vehicle, a pair of clamping jaws pivoted intermediate their ends to the tractor plate, said clamping jaws being provided with pin engaging surfaces at their front portions, a yoke slidably mounted on the tractor plate, means for forcing said yoke into locking engagement with the clamping jaws when the latter are in pin engaging position, and manually operative means for displacing said yoke to release position in respect of the clamping jaws, the clamping jaws being provided with tail portions and the yoke being provided with a central enlargement between said tail portions, said tail portions being adapted to engage said enlargement of the yoke upon release of the clamping jaws from the pin, whereby said yoke is forced to further release position in respect of the clamping jaws, said means for forcing said yoke into locking position being also adapted to yieldingly force the enlargement of the yoke into holding engagement with the tail portions of the clamping jaws when the latter are in released position.

CARL G. SEYFERTH.
HILBERT E. SWANSON.